(12) United States Patent
Liu et al.

(10) Patent No.: US 11,718,140 B2
(45) Date of Patent: Aug. 8, 2023

(54) SELF-BALANCING DEVICE FOR SELF-PROPELLED OFF-ROAD RV BOX BODY

(71) Applicant: BlackSeries Intelligent Equipment (Weihai) Co., Ltd, Weihai (CN)

(72) Inventors: Xinna Liu, Weihai (CN); Xiaodong Li, Weihai (CN); Yongliang Zhu, Weihai (CN)

(73) Assignee: BLACKSERIES INTELLIGENT EQUIPMENT (WEIHAI) CO., LTD, Weihai (CN)

(*) Notice: Subject to any disclaimer, the term of this patent is extended or adjusted under 35 U.S.C. 154(b) by 0 days.

(21) Appl. No.: 17/744,612

(22) Filed: May 13, 2022

(65) Prior Publication Data

US 2022/0402323 A1    Dec. 22, 2022

(30) Foreign Application Priority Data

Jun. 22, 2021 (CN) .......................... 2021106932550

(51) Int. Cl.
*B60G 21/055* (2006.01)
*B60G 21/02* (2006.01)
*B60P 3/32* (2006.01)

(52) U.S. Cl.
CPC ....... *B60G 21/0551* (2013.01); *B60G 21/026* (2013.01); *B60G 2300/07* (2013.01); *B60P 3/32* (2013.01)

(58) Field of Classification Search
CPC ........ B60G 2200/322; B60G 2800/912; B60G 9/02
USPC .................. 280/6.154, 124.106, 124.111
See application file for complete search history.

(56) References Cited

U.S. PATENT DOCUMENTS

| | | | | |
|---|---|---|---|---|
| RE20,140 E | * | 10/1936 | Poor ...................... | B66C 23/62 180/291 |
| 2,500,081 A | * | 3/1950 | Laurent .................. | B60G 9/02 280/124.111 |
| 2,510,424 A | * | 6/1950 | Shook ..................... | B60P 3/00 280/124.111 |
| 3,292,943 A | * | 12/1966 | Crockett ................. | B60G 9/02 280/124.167 |
| 3,414,290 A | * | 12/1968 | Wilfert ................... | B60G 3/02 280/124.111 |

(Continued)

*Primary Examiner* — Drew J Brown
*Assistant Examiner* — Maxwell L Meshaka
(74) *Attorney, Agent, or Firm* — Daniel M. Cohn; Howard M. Cohn (57) ABSTRACT

Disclosed is a self-balancing device for self-propelled off-road RV box body. The self-balancing device includes an auxiliary beam body for connecting with a bottom end of the RV box body, a front triangular balance beam body, a rear triangular balance beam body and an axle-holding device for connecting with a RV chassis girder. The front triangular balance beam body and the rear triangular balance beam body are arranged close to both ends of the auxiliary beam body respectively. The axle-holding device is arranged between the front triangular balance beam body and the rear triangular balance beam body. Both the front triangular balance beam body and the rear triangular balance beam body include a hard limit structure for limiting a swing angle of the RV box body. The axle-holding device includes a soft limit structure for horizontally resetting the RV box body.

18 Claims, 8 Drawing Sheets

(56) References Cited

U.S. PATENT DOCUMENTS

| | | | | |
|---|---|---|---|---|
| 3,481,421 A * | 12/1969 | Sullivan | B60K 17/24 | 184/6 |
| 3,481,623 A * | 12/1969 | Campbell | B62D 63/08 | 280/789 |
| 3,703,298 A * | 11/1972 | Laverda | A01D 75/285 | 280/124.112 |
| 3,721,457 A * | 3/1973 | Tracy | B60G 21/00 | 267/197 |
| 4,161,322 A * | 7/1979 | Ekeborg | B62D 53/005 | 280/124.112 |
| 4,232,754 A * | 11/1980 | Corrigan | B60G 11/22 | 180/9.5 |
| 4,416,109 A * | 11/1983 | Slazas | A01D 34/43 | 56/15.8 |
| 4,767,133 A * | 8/1988 | Yamada | B60G 11/12 | 280/124.113 |
| 5,374,082 A * | 12/1994 | Smith | B62D 21/20 | 280/789 |
| 6,086,088 A * | 7/2000 | Jurmu | B60G 9/02 | 280/682 |
| 6,126,178 A * | 10/2000 | Chino | B60G 17/005 | 280/6.154 |
| 6,131,918 A * | 10/2000 | Chino | B60G 17/005 | 280/124.112 |
| 6,244,613 B1 * | 6/2001 | Renger | B60G 11/225 | 280/485 |
| 6,565,105 B2 * | 5/2003 | Lin | B60G 9/02 | 280/124.113 |
| 6,942,232 B1 * | 9/2005 | McGhie | B60G 9/02 | 280/124.112 |
| 7,204,499 B2 * | 4/2007 | Miyake | B60G 9/02 | 280/759 |
| 7,213,824 B1 * | 5/2007 | McGhie | B60G 9/02 | 280/124.112 |
| 7,562,887 B1 * | 7/2009 | Sutton | B60G 9/02 | 280/124.112 |
| 8,777,242 B1 * | 7/2014 | Cheng | B60G 9/02 | 280/5.509 |
| 8,801,011 B1 * | 8/2014 | Jungen | B60G 9/00 | 280/682 |
| 11,376,917 B2 * | 7/2022 | Simon | B60G 17/0565 | |
| 2002/0171219 A1 * | 11/2002 | Sorum | B60G 21/106 | 280/124.16 |
| 2004/0108663 A1 * | 6/2004 | Rickers | B66F 9/07586 | 280/6.16 |
| 2004/0130114 A1 * | 7/2004 | Weichholdt | B60G 9/02 | 280/124.111 |
| 2004/0217571 A1 * | 11/2004 | Miyake | F16C 11/045 | 280/759 |
| 2005/0189730 A1 * | 9/2005 | White | B60G 9/02 | 280/6.154 |
| 2005/0248115 A1 * | 11/2005 | Huhmarkangas | B60G 17/016 | 280/124.135 |
| 2006/0175789 A1 * | 8/2006 | Mullican | B60G 9/00 | 280/124.112 |
| 2008/0231011 A1 * | 9/2008 | Bordini | B60G 9/022 | 280/124.112 |
| 2009/0194962 A1 * | 8/2009 | Simard | B60G 11/04 | 280/124.111 |
| 2014/0210176 A1 * | 7/2014 | Cheng | B60G 9/02 | 280/124.111 |
| 2020/0023913 A1 * | 1/2020 | Hon | B60G 17/019 | |
| 2021/0061046 A1 * | 3/2021 | Simon | B66F 11/04 | |

\* cited by examiner

SELF-BALANCING DEVICE FOR SELF-PROPELLED OFF-ROAD RV BOX BODY

CROSS REFERENCE TO RELATED APPLICATION

This patent application claims the benefit and priority of Chinese Patent Application No. 202110693255.0 filed on Jun. 22, 2021, the disclosure of which is incorporated by reference herein in its entirety as part of the present application.

TECHNICAL FIELD

The present disclosure relates to the technical field of off-road RV, and more specifically, to a self-balancing device for self-propelled off-road RV box body.

BACKGROUND ART

According to the mechanical analysis and experiment, when the RV box adopts the traditional box fixing method, the load reaches 5 tons and the speed reaches 10 km/h, the RV passes the bumpy test section of special sine wave and single twist road for dynamic pressure test. In the test, the instantaneous pressure on one side is 17 tons, and when it passes through the sine wave slope on the other side, the pressure quickly transfers to the other side of the box. Therefore, when it passes through this road section and does not pass at a very slow speed, it will seriously cause distortion damage to the vehicle body and endanger the safety of the rear box structure. Especially when the off-road RV encounters bumpy and potholes when the road condition is unknown and driving at high speed, it is very prone to danger.

Therefore, how to solve the problem that the off-road RV is easy to cause distortion injury to the vehicle body, endanger the safety of the rear box structure and is very prone to danger when passing through the bumpy road section at high speed is the key technical problem to be solved by those skilled in the art.

SUMMARY

In order to overcome the problems existing in relevant technologies to a certain extent, the purpose of the disclosure is to provide a self-balancing device for self-propelled off-road RV box body, which can solve the problems that the off-road RV is easy to cause distortion injury to the vehicle body, endanger the safety of the rear box structure and is very prone to danger when passing through the bumpy road section at high speed.

The present disclosure provides a self-balancing device for self-propelled off-road RV box body, which includes an auxiliary beam body for connecting with a bottom end of the RV box body, a front triangular balance beam body, a rear triangular balance beam body and an axle-holding device for connecting with a RV chassis girder. The front triangular balance beam body and the rear triangular balance beam body are arranged close to both ends of the auxiliary beam body respectively. The axle-holding device is arranged between the front triangular balance beam body and the rear triangular balance beam body. Both the front triangular balance beam body and the rear triangular balance beam body include a hard limit structure for limiting a swing angle of the RV box body. The axle-holding device includes a soft limit structure for horizontally resetting the RV box body.

Preferably, both the front triangular balance beam body and the rear triangular balance beam body further include a triangular main beam connected with the auxiliary beam body and two triangular auxiliary beams connected with the RV chassis girder. The two triangular auxiliary beams are respectively arranged at left and right ends of the triangular main beam and below the triangular main beam.

Preferably, two groups of the hard limit structures are arranged. The two groups of hard limit structures are fixedly arranged on the triangular main beam and are respectively located above the two triangular auxiliary beams.

Preferably, the axle-holding device further includes an axle-holding for fixedly connecting with the RV chassis girder and an axle-holding base for fixedly connecting with the auxiliary beam body. The axle-holding base is connected with the axle-holding. The soft limit structure is arranged between the axle-holding and the axle-holding base.

Preferably, two the axle-holding devices are arranged. The two axle-holding devices are respectively arranged close to left and right ends of the auxiliary beam body.

Preferably, the hard limit structure includes two limit blocks. The two limit blocks are respectively arranged on front and rear sides of the triangular main beam. A gap is left between the limit blocks and the auxiliary beam body.

Preferably, the soft limit structure is a rubber gasket sleeved outside the axle-holding.

Preferably, the auxiliary beam body includes two longitudinal beams and multiple transverse beams located between the two longitudinal beams. The front triangular balance beam body and the rear triangular balance beam body are fixedly connected with two the transverse beams close to front and rear ends of the longitudinal beam respectively. The axle-holding device is fixedly connected with the transverse beam located in a middle of the longitudinal beam.

Preferably, multiple first positioning holes are arranged on the transverse beam. The front triangular balance beam body and the rear triangular balance beam body are both provided with second positioning holes corresponding to the first positioning holes.

Preferably, the axle-holding device further includes an axle-holding connecting plate for connecting the RV chassis girder and the axle-holding. The axle-holding connecting plate and the axle-holding are in an integrated structure.

The technical solutions provided by the disclosure may include the following beneficial effects.

The disclosure provides a self-balancing device for self-propelled off-road RV box body. When the RV passes through bumpy road conditions, the torque generated by the vehicle body itself is transmitted from the tire to the chassis girder, and then from the chassis girder to the front triangular balance beam body and the rear triangular balance beam body. The excessive swing angle of the RV box is limited by the hard limit structure, the inertia and gravity are buffered reversely by the axle-holding device, and the RV box is returned and corrected by the soft limit structure. The self-balancing device reduces the danger of the box body due to the large torque on the left and right, greatly increases the trafficability to the road conditions, and solves the problem that the off-road RV is easy to cause the distortion injury to the vehicle body when passing through the bumpy road section at high speed, endanger the safety of the rear box structure, and is very prone to danger.

It should be understood that the above general description and the following detailed description are only exemplary and explanatory and do not limit the application.

BRIEF DESCRIPTION OF THE DRAWINGS

The drawings herein are incorporated into the specification and form a part of the specification, showing embodiments consistent with the application, and are used together with the specification to explain the principles of the application.

In the figures.

1. Longitudinal beam; 2. Transverse beam; 3. Front triangular balance beam body; 4. Axle-holding device; 5. Tail beam; 6. Side inclined support beam; 7. Rear triangular balance beam body; 8. Side inclined support beam backing plate; 9. Balance beam reinforcing plate; 10. Trapezoidal reinforcing plate; 11. Balance beam fastening bolt; 12. Main plate; 13. Balance vertical beam; 14. Vertical beam reinforcing plate; 15. Limit block; 16. Triangular backing plate; 17. Triangular plate; 18. Triangular reinforcing plate; 19. First positioning hole; 20. Second positioning hole; 21. Axle-holding; 22. Connecting main plate; 23. Axle-holding support base; 24. First reinforcing plate; 25. Second reinforcing plate; 26. Third reinforcing plate; 27. Fourth reinforcing plate; 28. Fixing plate; 29. Axle-holding base connecting plate; 30. First cylindrical clamp; 31. Second cylindrical clamp; 32. Connecting part; 33. Axle-holding base reinforcing plate.

DETAILED DESCRIPTION OF THE EMBODIMENTS

Exemplary embodiments will be described in detail herein, examples of which are shown in the drawings. When the following description relates to the drawings, unless otherwise indicated, the same numbers in different drawings represent the same or similar elements. The embodiments described in the following exemplary embodiments do not represent all embodiments consistent with this application. Rather, they are merely examples of devices consistent with some aspects of the present application as detailed in the appended claims.

Referring to FIG. 1-FIG. 8, this embodiment provides a self-balancing device for self-propelled off-road RV box body, which includes an auxiliary beam body, a front triangular balance beam body 3, a rear triangular balance beam body 7 and an axle-holding device 4. The auxiliary beam body is used to connect with the bottom end of the RV box body, and the front triangular balance beam body 3, the rear triangular balance beam body 7 and the axle-holding device 4 are used to connect with the RV chassis girder, so that the RV box body is connected with the RV chassis.

Figure 1:
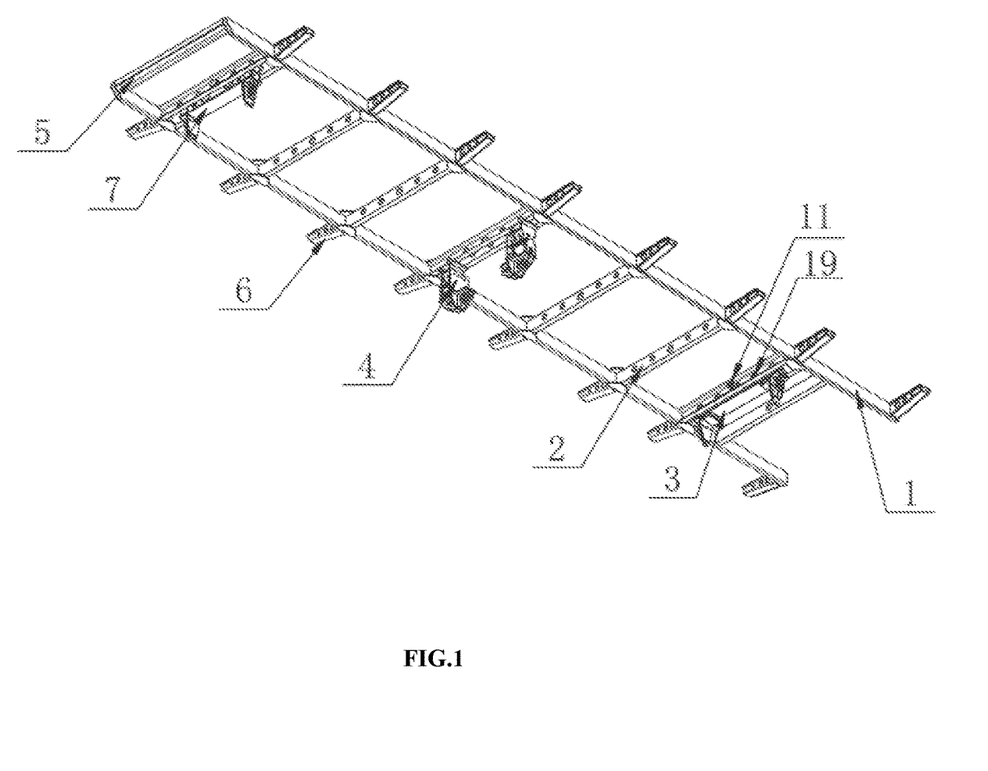
FIG. 1 is a perspective view of the present self-balancing device according to some exemplary embodiments.
Figure 2:
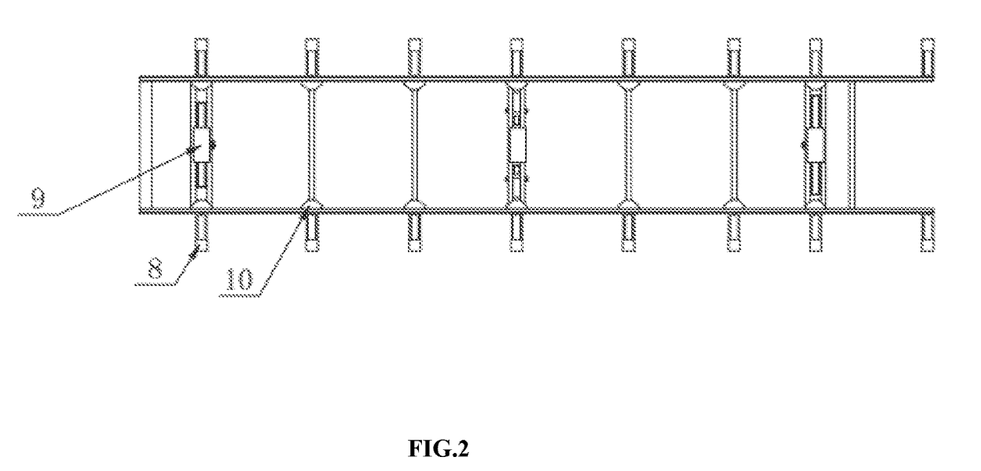
FIG. 2 is a top view of the present self-balancing device according to some exemplary embodiments.
Figure 3:
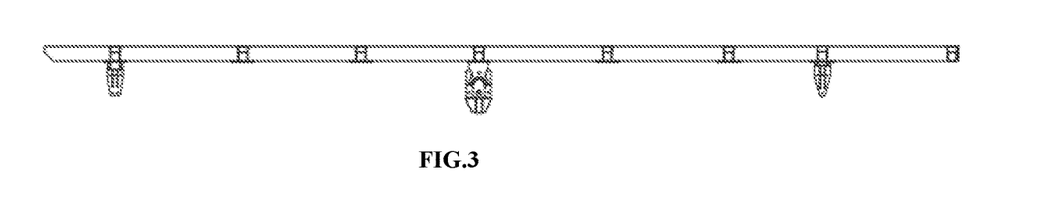
FIG. 3 is a side view of the present self-balancing device according to some exemplary embodiments.

The front triangular balance beam body 3 and the rear triangular balance beam body 7 are arranged close to both ends of the auxiliary beam body respectively, and the axle-holding device 4 is arranged between the front triangular balance beam body 3 and the rear triangular balance beam body 7 to ensure the stability and balance of the connection with the RV chassis.

Both the front triangular balance beam body 3 and the rear triangular balance beam body 7 include a hard limit structure for limiting a swing angle of the RV box body, so as to reduce the risk of the RV box body due to large swing from left to right through the reverse buffer of the front triangular balance beam body 3 and the rear triangular balance beam body 7. The axle-holding device 4 includes a soft limit structure for horizontally resetting the RV box body to realize the return correction of the RV box body.

In this way, when the RV passes through bumpy road conditions, the torque generated by the vehicle body itself is transmitted from the tire to the chassis girder, and then from the chassis girder to the front triangular balance beam body and the rear triangular balance beam body. The excessive swing angle of the RV box is limited by the hard limit structure, the inertia and gravity are buffered reversely by the axle-holding device, and the RV box is returned and corrected by the soft limit structure. The self-balancing device reduces the danger of the box body due to the large torque on the left and right, greatly increases the trafficability to the road conditions, and solves the problem that the off-road RV is easy to cause the distortion injury to the vehicle body when passing through the bumpy road section at high speed, endanger the safety of the rear box structure, and is very prone to danger.

Figure 4:
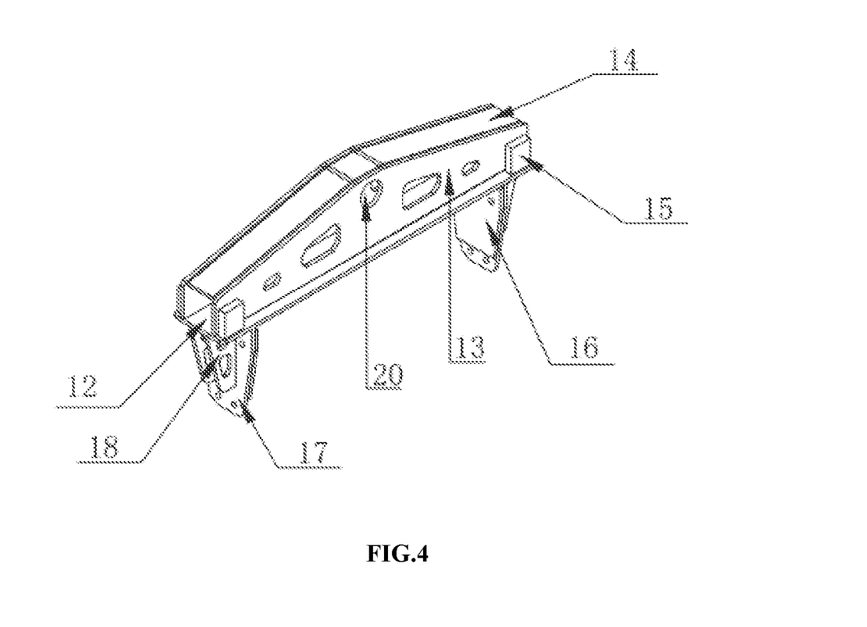
FIG. 4 is a perspective view of the front triangular balance beam body or the rear triangular balance beam according to some exemplary embodiments.

In the embodiment, as shown in FIG. 4, both the front triangular balance beam body 3 and the rear triangular balance beam body 7 further include a triangular main beam and two triangular auxiliary beams. The two triangular auxiliary beams are respectively arranged at left and right ends of the triangular main beam and below the triangular main beam. The triangular main beam is connected with the main body of the auxiliary beam, and the triangular auxiliary beam is used to connect with the RV chassis girder, so as to realize the connection between the main body of the auxiliary beam and the chassis girder.

Preferably, two groups of the hard limit structures are arranged. The two groups of hard limit structures are fixedly arranged on the triangular main beam and are respectively located above the two triangular auxiliary beams to limit the angle of the left and right sides of the RV box body.

Each group of the hard limit structure includes two limit blocks 15. The two limit blocks are respectively arranged on front and rear sides of the triangular main beam. A gap is left between the limit blocks and the auxiliary beam body, so that the RV box body can swing at the left and right angles. And the top of the limit block 15 can offset the auxiliary beam body to limit the swing angle of the RV box body.

The triangular main beam includes a main plate 12, two parallel balance vertical beams 13 fixedly arranged above the main plate 12, and a vertical beam reinforcing plate 14 arranged between the two balance vertical beams 13. Two balance vertical beams 13 are used to connect with the auxiliary beam body. Two groups of hard limit structures are fixedly arranged on the main plate 12 and are respectively located at the left and right ends of the main plate 12. Specifically, two limit blocks 15 of each group of hard limit structure are respectively arranged at the front and rear ends of the main plate 12, and the two balance vertical beams 13 are clamped in the middle.

The triangular auxiliary beam includes a triangular plate 17 and a triangular reinforcing plate 18 for connecting with the RV chassis girder. The triangular plate 17 and the triangular reinforcing plate 18 are fixedly connected with the main plate 12. The triangular reinforcing plate 18 is arranged on the side of the triangular plate 17 away from the RV chassis girder to improve the triangular plate 17. A triangular backing plate 16 is also arranged on the side where the triangular plate 17 is connected with the RV chassis girder to avoid wear between the triangular plate 17 and the RV chassis girder.

Figure 8:
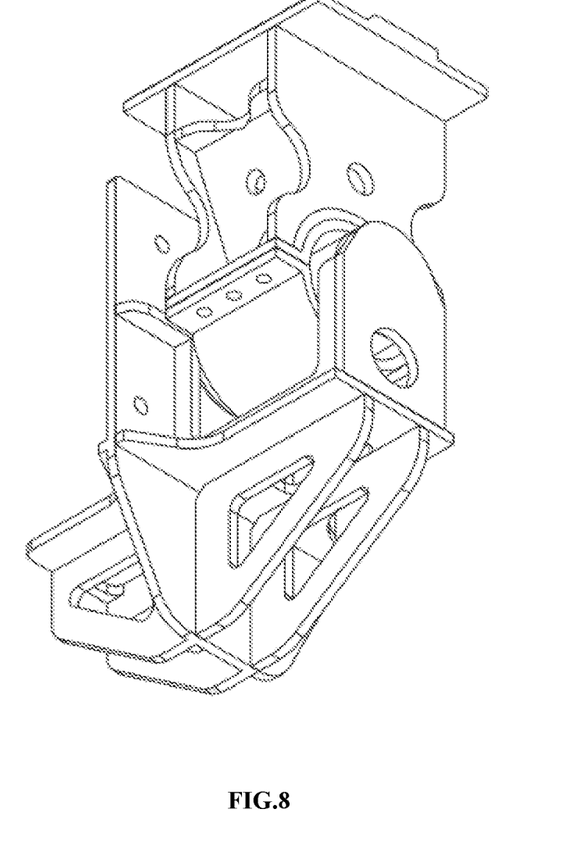
FIG. 8 is a perspective view of the axle-holding device according to some exemplary embodiments.

In the embodiment, the axle-holding device 4 further includes an axle-holding 21 and an axle-holding base. The axle-holding is used for fixedly connecting with the RV chassis girder fixedly, the axle-holding base is used for connecting with the auxiliary beam body, so that the auxiliary beam body is connected with the RV chassis girder.

The axle-holding 21 is connected with the axle-holding base, and the soft limit structure is arranged between the axle-holding 21 and the axle-holding base to realize the return correction of the box.

Preferably, as shown in FIG. 1, two the axle-holding devices 4 are arranged. The two axle-holding devices 4 are respectively arranged close to left and right ends of the auxiliary beam body. That is, two the soft limit structures are also arranged, and the two soft limit structures are respectively sleeved on the two axle-holdings 21 to ensure the balance of the RV box body and enable the RV box body to be horizontally reset.

Here, the soft limit structure can be a rubber gasket, and the rubber gasket is set outside the holding shaft 21 to produce elastic force, so that the RV box body can be returned and corrected. Specifically, the rubber gasket can be an antifreeze, wear-resistant and pressure-resistant rubber material or silica gel material, which is not specifically limited here.

Figure 5:
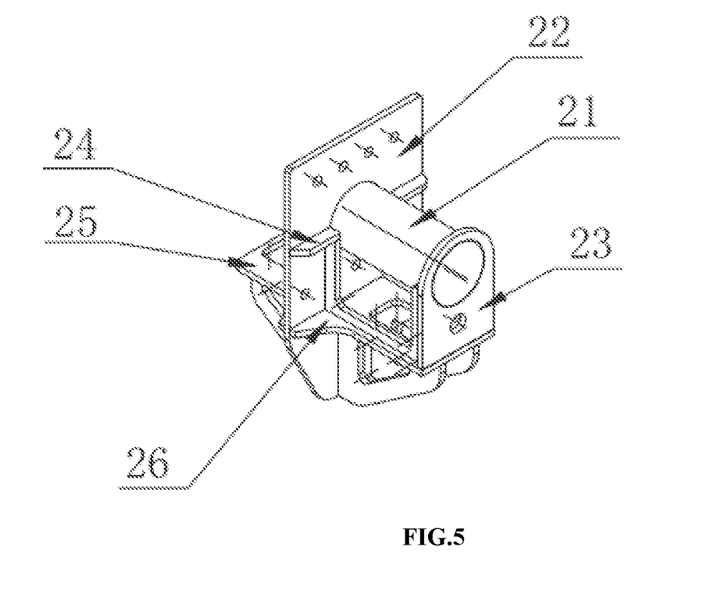
FIG. 5 is a perspective view of the axle-holding according to some exemplary embodiments.
Figure 6:
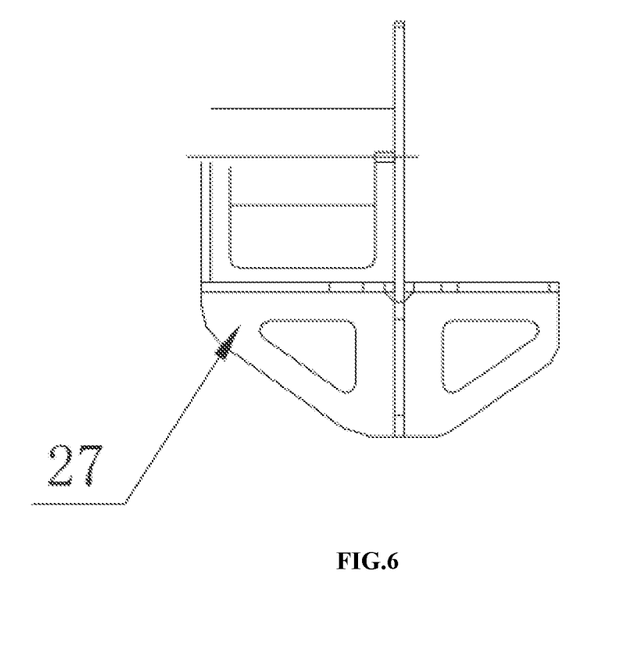
FIG. 6 is a side view of the axle-holding according to some exemplary embodiments.

The axle-holding device 4 further includes an axle-holding connecting plate for connecting the RV chassis girder and the axle-holding. The axle-holding connecting plate and the axle-holding are in an integrated structure.

Here, as shown in FIG. 5, the axle-holding connecting plate includes a connecting main plate 22 connected with the RV chassis girder, an axle-holding support base 23 integrated with the connecting main plate 22, and an axle-holding reinforcing plate for strengthening the connection strength between the axle-holding support base 23 and the connecting main plate 22. The axle-holding 21 is arranged on the axle-holding support base 23, and a space is reserved between the axle-holding 21 and the axle-holding support base 23 to facilitate the connection between the axle-holding base and the axle-holding 21. The axle-holding reinforcing plate includes a first reinforcing plate 24, a second reinforcing plate 25, a third reinforcing plate 26 and a fourth reinforcing plate 27 to improve the connection strength between the axle-holding support base 23 and the connecting main plate 22.

Figure 7:
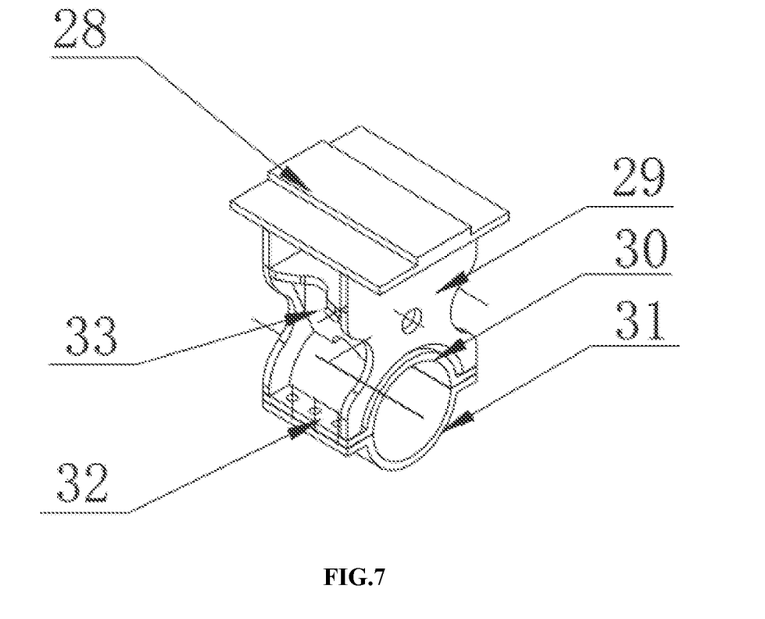
FIG. 7 is a perspective view of the axle-holding base according to some exemplary embodiments.

As shown in FIG. 7, the axle-holding base includes two axle-holding base connecting plates 29 for connecting with the auxiliary beam body, an axle-holding cylindrical clamp arranged at the bottom end of the two axle-holding base connecting plates 29, and an axle-holding base reinforcing plate 33 for connecting the two axle-holding base connecting plates 29. The axle-holding cylindrical clamp includes a first cylindrical clamp 30 and a second cylindrical clamp 31 matched with the first cylindrical clamp 30. The front and rear ends of the first cylindrical clamp 30 and the second cylindrical clamp 31 are provided with connecting parts 32. The connecting parts of the first cylindrical clamp 30 and the second cylindrical clamp 31 are provided with mounting holes for bolts to pass through, so as to facilitate the connection between the first cylindrical clamp 30 and the second cylindrical clamp 31. The bottom ends of the two axle-holding base connecting plates 29 are respectively connected with the left and right ends of the first cylindrical clamp 30, and the axle-holding base reinforcing plate 33 is connected with the first cylindrical clamp 30 to strengthen the connection between the axle-holding cylindrical clamps and the axle-holding base connecting plates 29.

The top of the axle-holding base connecting plate 29 is also provided with a fixing plate 28. The top ends of the two axle-holding base connecting plates 29 are connected to the fixing plate 28. The fixing plate 28 is used for fixed connection with the auxiliary beam body.

In this embodiment, the auxiliary beam body includes two longitudinal beams 1 and multiple transverse beams 2. The multiple transverse beams 2 are arranged between the two longitudinal beams 1 and are fixedly connected with the longitudinal beams 1. The front triangular balance beam body 3 and the rear triangular balance beam body 7 are fixedly connected with two transverse beams near the front end and rear end of the longitudinal beam 1 respectively. And the axle-holding device 4 is fixedly connected with the transverse beam located in the middle of the longitudinal beam 1, so that the stability and balance of the connection between the auxiliary beam body and the RV chassis girder are ensured.

Multiple first positioning holes 19 are arranged on the transverse beam 2. The front triangular balance beam body 3 and the rear triangular balance beam body 7 are both provided with second positioning holes 20 corresponding to the first positioning holes 19 so that the balance beam fastening bolts 11 pass through the first positioning holes 19 and the second positioning holes 20, so as to connect the front triangular balance beam body 3 and the rear triangular balance beam body 7 with the transverse beam 2.

It should be noted that the installation position of the second positioning holes 20 are determined according to the RV model. When installing the front triangular balance beam body 3 and the rear triangular balance beam body 7, the first positioning holes 19 corresponding to the second positioning holes 20 are different for different RV models. The specific location is not limited here, which is determined according to the actual situation.

Moreover, the transverse beams 2 connected with the front triangular balance beam body 3 and the rear triangular balance beam body 7 include a first transverse beam and a second cross beam. The first transverse beam and the second transverse beam are arranged in parallel, and both ends of the first transverse beam and the second transverse beam are fixedly connected with the two longitudinal beams 1. Multiple second positioning holes 20 are arranged on the first transverse beam and the second transverse beam, and the first positioning holes 19 are arranged on the triangular main beam. Specifically, the first positioning holes 19 are arranged on the two balance vertical beams 13, corresponding to the second positioning holes 20, so as to connect the first transverse beam, the second transverse beam and the triangular main beam through the balance beam fastening bolts 11. A space for the triangular main beam to extend is reserved between the first transverse beam and the second transverse beam, so that the first transverse beam and the second transverse beam can clamp the triangular main beam, so as to improve the stability of the connection between the front triangular balance beam body 3 and the rear triangular balance beam body 7 and the auxiliary beam main body. The top ends of the first transverse beam and the second transverse beam are also provided with a balance beam reinforcing plate 9 for connecting the front triangular balance beam main body and the rear triangular balance beam main body, so as to further improve the stability of the connection between the front triangular balance beam body and the rear triangular balance beam body and the auxiliary beam body.

The transverse beam 2 connected with the axle-holding device 4 also includes a first transverse beam and a second transverse beam. A certain distance is reserved between the first transverse beam and the second transverse beam for the top of the axle-holding base to be embedded. In this way, the first transverse beam and the second transverse beam can play a certain clamping role on the axle-holding base, so as to improve the stability of the connection between the axle-holding base and the transverse beams.

The auxiliary beam body also includes multiple groups of side inclined support beams fixedly connected with the longitudinal beam 1 for connection with the RV box body. The multiple groups of side inclined support beams correspond to the multiple transverse beams 2 one by one, and each group of side inclined support beams includes two side inclined support beams 6. The two side inclined support beams 6 are fixedly connected with the two longitudinal beams 1 respectively. A side inclined support beam backing plate 8 is also arranged above the side inclined support beam 6 to avoid wear of the RV box body.

Trapezoidal reinforcing plates 10 are arranged at the connection between the left and right ends of the transverse beam 2 respectively and the two longitudinal beams 1 to improve the stability of the connection between the transverse beam 2 and the longitudinal beams 1.

The auxiliary beam body further includes a tail beam 5, which is arranged at the tail ends (rear ends) of the two longitudinal beams 1 to connect the tail ends of the two longitudinal beams 1, so as to improve the stability of the auxiliary beam body.

The self-balancing device is specifically analyzed in combination with the above embodiments.

Position welding and reinforcement are carried out on the longitudinal beams 1, the transverse beams 2, the side inclined support beams 6 and each connecting reinforcing plate, etc., to obtain the auxiliary beam body, and then the auxiliary beam body is installed on the transverse beam with the front triangular balance beam body 3 and the rear triangular balance beam body 7, so that the RV box body can swing at left and right angles. The first angle is limited by the four limit blocks 15 on the front triangle balance beam body 3 and the rear triangle balance beam body 7. And the axle-holding 21 and the axle-holding base are installed on the middle transverse beam of the auxiliary beam body, so that the axle-holding base and the axle-holding 21 are locked and fixed. The rubber gasket set on the axle-holding 21 is used to limit the secondary angle and reset the horizontal position of the box body. The two triangular plates 17 of the front triangular balance beam body 3 and the rear triangular balance beam body 7 and the connecting main plate 22 of the two axle-holdings 21 are connected with the RV chassis girder to form six connecting points. Under the bumpy road conditions, the self-balancing device can enable the RV box body to achieve reverse buffering and return to balance.

Specifically, the front triangular balance beam body 3 and the rear triangular balance beam body 7 are fixed on the RV chassis girder. When the vehicle body passes through bumpy road conditions, the left and right torsion generated by the vehicle body itself is transmitted to the RV chassis girder by the tires. The torsion is then transmitted from the girder to the front triangular balance beam body 3, the rear triangular balance beam body 7 and the axle-holding device 4 for reverse buffering of inertia and gravity. Then, the two axle-holding bases, axle-holdings and the special rubber gaskets of the self-balancing device produce positioning elastic rebound to return the RV box body for correction. The left and right torsion of the RV box body caused by the bumpy road conditions is released by the 1-degree free angle limited on the left and right of the box body, so as to reduce the danger caused by the large left and right torsion of the RV box body itself and greatly increase the trafficability to the road conditions.

In addition, the manufacturing process of the self-balancing device mainly includes sheet metal, welding, machining, etc., and the low-cost manufacturing greatly increases the passability of the off-road RV in various road conditions. The self-balancing device mainly uses the body weight and the reverse buffer generated by the undulating wheel side to greatly reduce the stress caused by the swing. Simple, easy to install, no manual operation, wide range of applications. Without other electric power, oil pressure and expensive hanging system, the box body could reduce pressure and balance itself. The structure is simple, and it is convenient to install. There is no need for manual operation, and the application range is wide.

The above description is only specific embodiments of the present disclosure, but the protection scope of the present disclosure is not limited thereto. Any person skilled in the art who can easily think of changes or substitutions within the technical scope of the present disclosure should be covered within the protection scope of the present disclosure. Therefore, the protection scope of the present disclosure should be based on the protection scope of the claims.

It is to be understood that the same or similar parts in the above embodiments may be referred to each other, and the contents not described in detail in some embodiments may be referred to the same or similar contents in other embodiments.

Although the embodiments of the present application have been shown and described above, it is to be understood that the above embodiments are exemplary and are not to be construed as limiting the present application. Variations, modifications and substitutions of the above embodiments may be made by those of ordinary skill in the art within the scope of this application.

What is claimed is:

1. A self-balancing device for self-propelled off-road RV box body, comprising an auxiliary beam body, a front triangular balance beam body (3), a rear triangular balance beam body (7) and an axle-holding device (4) for connecting with a RV chassis girder, wherein the front triangular balance beam body (3) and the rear triangular balance beam body (7) are arranged close to both ends of the auxiliary beam body respectively, the axle-holding device (4) is arranged between the front triangular balance beam body (3) and the rear triangular balance beam body (7), and both the front triangular balance beam body (3) and the rear triangular balance beam body (7) comprise a hard limit structure, and the axle-holding device (4) comprises a soft limit structure for horizontally resetting the RV box body;

wherein both the front triangular balance beam body (3) and the rear triangular balance beam body (7) further comprise a triangular main beam connected with the auxiliary beam body and two triangular auxiliary beams connected with the RV chassis girder, and the two triangular auxiliary beams are respectively arranged at left and right ends of the triangular main beam and below the triangular main beam;

wherein the triangular main beam comprises a main plate (12), two parallel balance vertical beams (13) fixedly arranged above the main plate (12), and a vertical beam reinforcing plate 14 arranged between the two balance vertical beams (13).

2. The self-balancing device for self-propelled off-road RV box body of claim 1, wherein two groups of the hard limit structures are arranged, and the two groups of hard limit structures are fixedly arranged on the triangular main beam and are respectively located above the two triangular auxiliary beams.

3. The self-balancing device for self-propelled off-road RV box body of claim 2, wherein the hard limit structure comprises two limit blocks (15), the two limit blocks (15) are respectively arranged on front and rear sides of the triangular main beam, and a gap is left between the limit blocks (15) and the auxiliary beam body, wherein two limit blocks (15) of each group of hard limit structure are respectively arranged at the front and rear ends of the main plate (12), and the two balance vertical beams (13) are clamped in the middle.

4. The self-balancing device for self-propelled off-road RV box body of claim 1, wherein the axle-holding device (4) further comprises an axle-holding (21) for fixedly connecting with the RV chassis girder and an axle-holding base for fixedly connecting with the auxiliary beam body, the axle-holding base is connected with the axle-holding (21), and the soft limit structure is arranged between the axle-holding (21) and the axle-holding base.

5. The self-balancing device for self-propelled off-road RV box body of claim 4, wherein two axle-holding devices (4) are arranged, and the two axle-holding devices (4) are respectively arranged close to left and right ends of the auxiliary beam body.

6. The self-balancing device for self-propelled off-road RV box body of claim 4, wherein the soft limit structure is a rubber gasket sleeved outside the axle-holding (21).

7. The self-balancing device for self-propelled off-road RV box body of claim 4, wherein the axle-holding device (4) further comprises an axle-holding connecting plate for connecting the RV chassis girder and the axle-holding (21), and the axle-holding connecting plate and the axle-holding (21) are in an integrated structure.

8. The self-balancing device for self-propelled off-road RV box body of claim 4, wherein axle-holding connecting plate comprises a connecting main plate (22) connected with the RV chassis girder, an axle-holding support base (23) integrated with the connecting main plate (22), and an axle-holding reinforcing plate for strengthening the connection strength between the axle-holding support base (23) and the connecting main plate (22), the axle-holding (21) is arranged on the axle-holding support base (23), and a space is reserved between the axle-holding (21) and the axle-holding support base (23) to facilitate the connection between the axle-holding base (23) and the axle-holding (21).

9. The self-balancing device for self-propelled off-road RV box body of claim 8, wherein the axle-holding reinforcing plate comprises a first reinforcing plate (24), a second reinforcing plate (25), a third reinforcing plate (26) and a fourth reinforcing plate (27) to improve a connection strength between the axle-holding support base (23) and the connecting main plate (22).

10. The self-balancing device for self-propelled off-road RV box body of claim 4, wherein the axle-holding base comprises two axle-holding base connecting plates (29) for connecting with the auxiliary beam body, an axle-holding cylindrical clamp arranged at the bottom end of the two axle-holding base connecting plates (29), and an axle-holding base reinforcing plate (33) for connecting the two axle-holding base connecting plates (29).

11. The self-balancing device for self-propelled off-road RV box body of claim 10, the axle-holding cylindrical clamp comprises a first cylindrical clamp (30) and a second cylindrical clamp (31) matched with the first cylindrical clamp (30).

12. The self-balancing device for self-propelled off-road RV box body of claim 11, wherein the front and rear ends of the first cylindrical clamp (30) and the second cylindrical clamp (31) are provided with connecting parts (32), the connecting parts of the first cylindrical clamp (30) and the second cylindrical clamp (31) are provided with mounting holes for bolts to pass through, so as to facilitate a connection between the first cylindrical clamp (30) and the second cylindrical clamp (31).

13. The self-balancing device for self-propelled off-road RV box body of claim 12, bottom ends of the two axle-holding base connecting plates (29) are respectively connected with left and right ends of the first cylindrical clamp (30), and the axle-holding base reinforcing plate (33) is connected with the first cylindrical clamp (30) to strengthen a connection between the axle-holding cylindrical clamps and the axle-holding base connecting plates (29).

14. The self-balancing device for self-propelled off-road RV box body of claim 10, a top of the axle-holding base connecting plate (29) is also provided with a fixing plate (28), top ends of the two axle-holding base connecting plates (29) are connected to the fixing plate (28), the fixing plate 28 is configured for a fixed connection with the auxiliary beam body.

15. The self-balancing device for self-propelled off-road RV box body of claim 1, wherein the auxiliary beam body comprises two longitudinal beams (1) and a plurality of transverse beams (2) located between the two longitudinal beams (1), and the front triangular balance beam body (3) and the rear triangular balance beam body (7) are fixedly connected with two transverse beams of the plurality of transverse beams close to front and rear ends of the longitudinal beam (1) respectively, and the axle-holding device (4) is fixedly connected with a third transverse beam of the plurality of transverse beams located in a middle of the longitudinal beam (1).

16. The self-balancing device for self-propelled off-road RV box body of claim 15, wherein a plurality of first positioning holes (19) are arranged on each transverse beam of the plurality of transverse beams (2), and the front triangular balance beam body (3) and the rear triangular balance beam body (7) are both provided with second positioning holes (20) corresponding to the first positioning holes (19).

17. The self-balancing device for self-propelled off-road RV box body of claim 1, the triangular auxiliary beam comprises a triangular plate (17) and a triangular reinforcing plate (18) for connecting with the RV chassis girder, the triangular plate (17) and the triangular reinforcing plate (18) are fixedly connected with the main plate (12), the triangular reinforcing plate (18) is arranged on the side of the triangular plate 17 away from the RV chassis girder to improve the triangular plate (17).

18. The self-balancing device for self-propelled off-road RV box body of claim 17, wherein a triangular backing plate (16) is arranged on the side where the triangular plate (17) is connected with the RV chassis girder to avoid wear between the triangular plate (17) and the RV chassis girder.

\* \* \* \* \*